(12) United States Patent
Winans

(10) Patent No.: US 11,854,100 B2
(45) Date of Patent: *Dec. 26, 2023

(54) PROPERTY INSPECTION SYSTEM AND METHOD

(71) Applicant: FLYREEL, INC., Denver, CO (US)

(72) Inventor: Cole Winans, Vanzant, MO (US)

(73) Assignee: FLYREEL, INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,861

(22) Filed: Oct. 12, 2022

(65) Prior Publication Data

US 2023/0076429 A1    Mar. 9, 2023

Related U.S. Application Data

(63) Continuation of application No. 16/276,405, filed on Feb. 14, 2019, now Pat. No. 11,494,857.

(60) Provisional application No. 62/631,266, filed on Feb. 15, 2018.

(51) Int. Cl.
| | | |
|---|---|---|
| *G06Q 50/16* | (2012.01) | |
| *G06Q 40/08* | (2012.01) | |
| *G06V 20/64* | (2022.01) | |

(52) U.S. Cl.
CPC ............. *G06Q 50/16* (2013.01); *G06Q 40/08* (2013.01); *G06V 20/64* (2022.01)

(58) Field of Classification Search
CPC ......... G06Q 50/16; G06Q 40/08; G06V 20/64
See application file for complete search history.

(56) References Cited

U.S. PATENT DOCUMENTS 10,783,559 B1    9/2020   Tran
11,494,857 B2 *  11/2022  Winans .................. G06Q 40/08

\* cited by examiner

*Primary Examiner* — Diane D Mizrahi
(74) *Attorney, Agent, or Firm* — TROUTMAN PEPPER HAMILTON SANDERS LLP; James E. Schutz; Mark Lehi Jones

(57) ABSTRACT

A computer system and method for performing property inspections. Digital media is received in a computer vision image analysis system from one or more user devices via a network and a determination is made regarding an environment type associated with the received digital media. One or more objects are determined that are located in the determined environment and which are present in the received digital media. A determination is made regarding an absence of objects in the received digital media contingent upon the determined environment type based upon a set of rules.

20 Claims, 5 Drawing Sheets

PROPERTY INSPECTION SYSTEM AND METHOD

CROSS REFERENCE TO RELATED APPLICATIONS

This application is a continuation claiming priority under 35 U.S.C. § 120 to U.S. patent application Ser. No. 16/276,405, filed 14 Feb. 2019 and published as U.S. Patent Publication No. US20190251645 on 15 Aug. 2019, which claims priority to U.S. Patent Application Ser. No. 62/631,266, filed 15 Feb. 2018, the contents of which are incorporated herein by reference in its entirety as if presented in full.

FIELD OF THE INVENTION

The disclosed embodiments generally relate to artificial intelligence, and more particularly, to creating conversational flows with users utilizing artificial intelligence analysis of optical sensor data

BACKGROUND OF THE INVENTION

When an insurance provider offers insurance for a home or business, they are taking on the risk that any damage or liability associated with that property can be offset by premium payments made by property owners. In order to create a good balance between offering competitive prices and managing risk, an insurance provider may wish to assess the relative risk of each potential insurable property. Then, properties with lower risk may be offered lower premiums while higher-risk properties are offered higher premiums to compensate for the higher risk. An inspection of the property to be insured is essential to determine the risk.

Property inspection historically required a trained professional to physically travel to a property to conduct a comprehensive property assessment while documenting important details in a report or a series of reports. This process has proven inefficient and requires training of professional as well as travel time and expenses for transportation and inspection labor. In some scenarios, property inspections are not performed at all (e.g., sight unseen), thus insurance providers and other parties expose themselves to an unnecessary level of risk.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

An illustrative embodiment involves an insurance provider receiving information about an insured property preferably from a user of a smart device located in an area of the property, where the information is indicative of risk associated with the property. Based on the received information, the insurance provider determines a risk-adjusted insurance premium for the property to adjust for the indicated risk. In particular, the illustrated embodiment provides an Artificial Intelligence (AI) assistant for the underwriting process. In particular, the AI assistant guides users, preferably via a conversational flow process, through an underwriting and inspection process such that any user of a smart device having a camera can capture property information to be utilized in an underwriting process without resort to costly trained professionals. Insurance providers and other parties that benefit from such property data are thus enabled to gather important property information faster and more affordably then previously accomplished with trained professionals for determining property value and risk exposure.

BRIEF DESCRIPTION OF THE DRAWINGS

The accompanying appendices and/or drawings illustrate various non-limiting, example, inventive aspects in accordance with the present disclosure.

DETAILED DESCRIPTION

Figure 1:
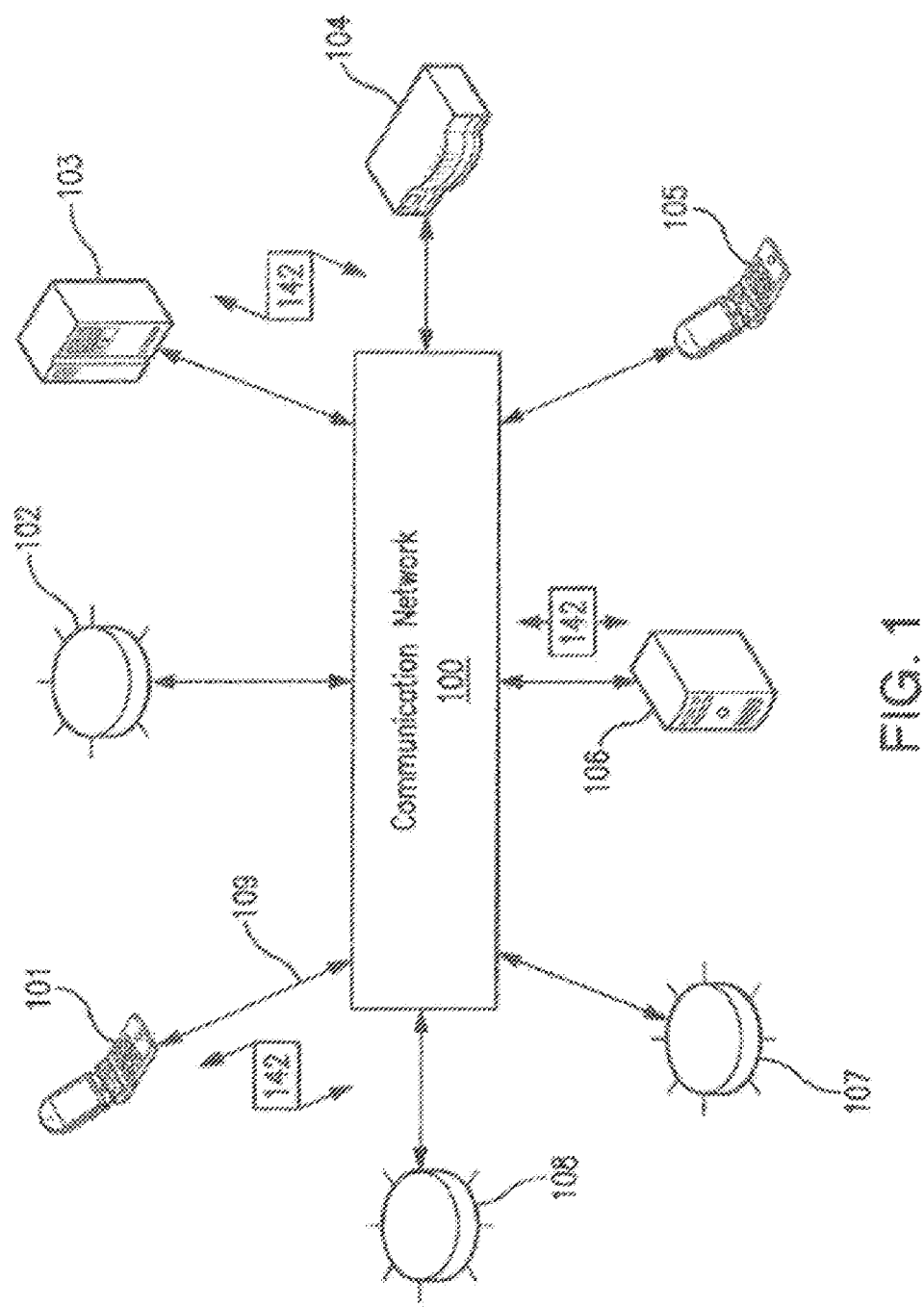
FIG. 1 illustrates an example system level diagram of a communication network for use with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
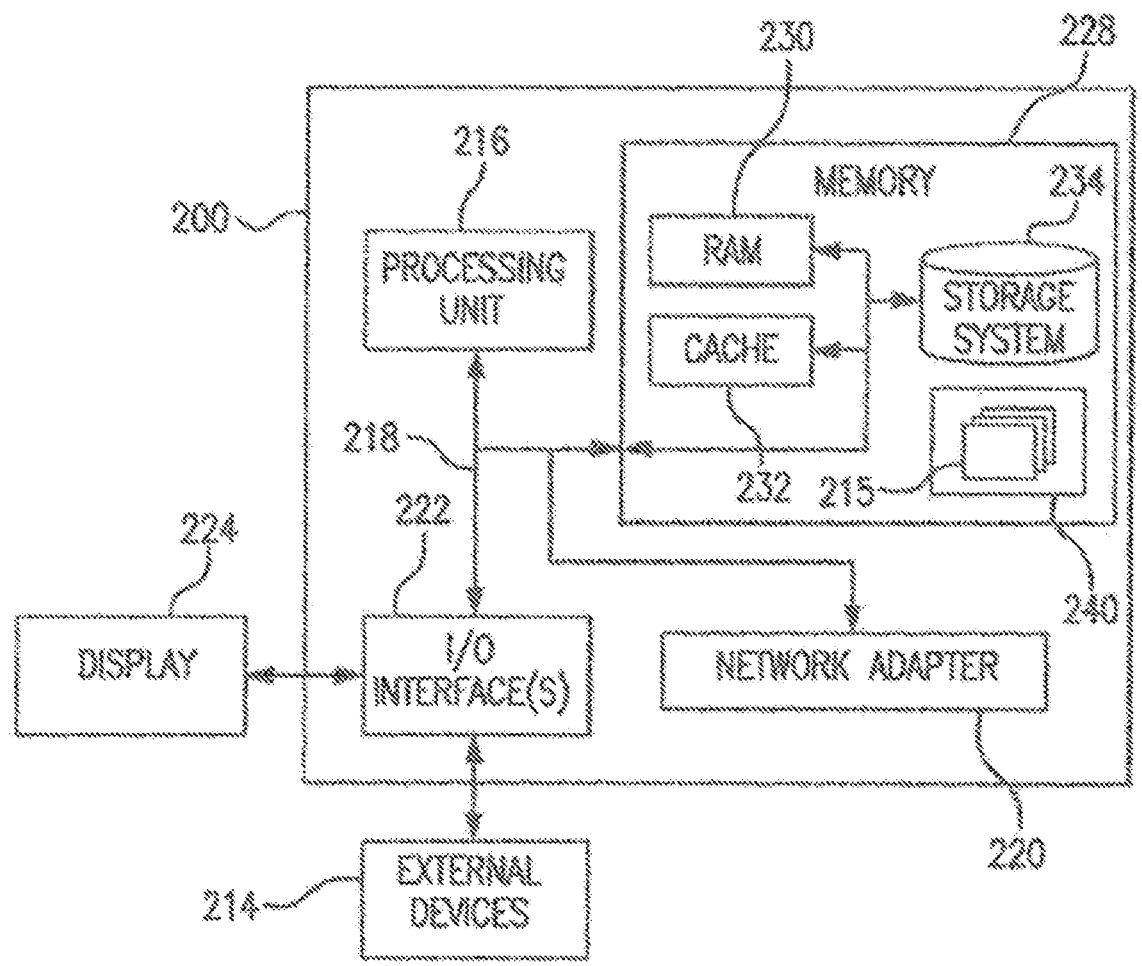
FIG. 2 illustrates an example system level diagram of network device/node which encompasses at least a portion of an illustrated embodiment and may be used in the communication network of FIG. 1.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
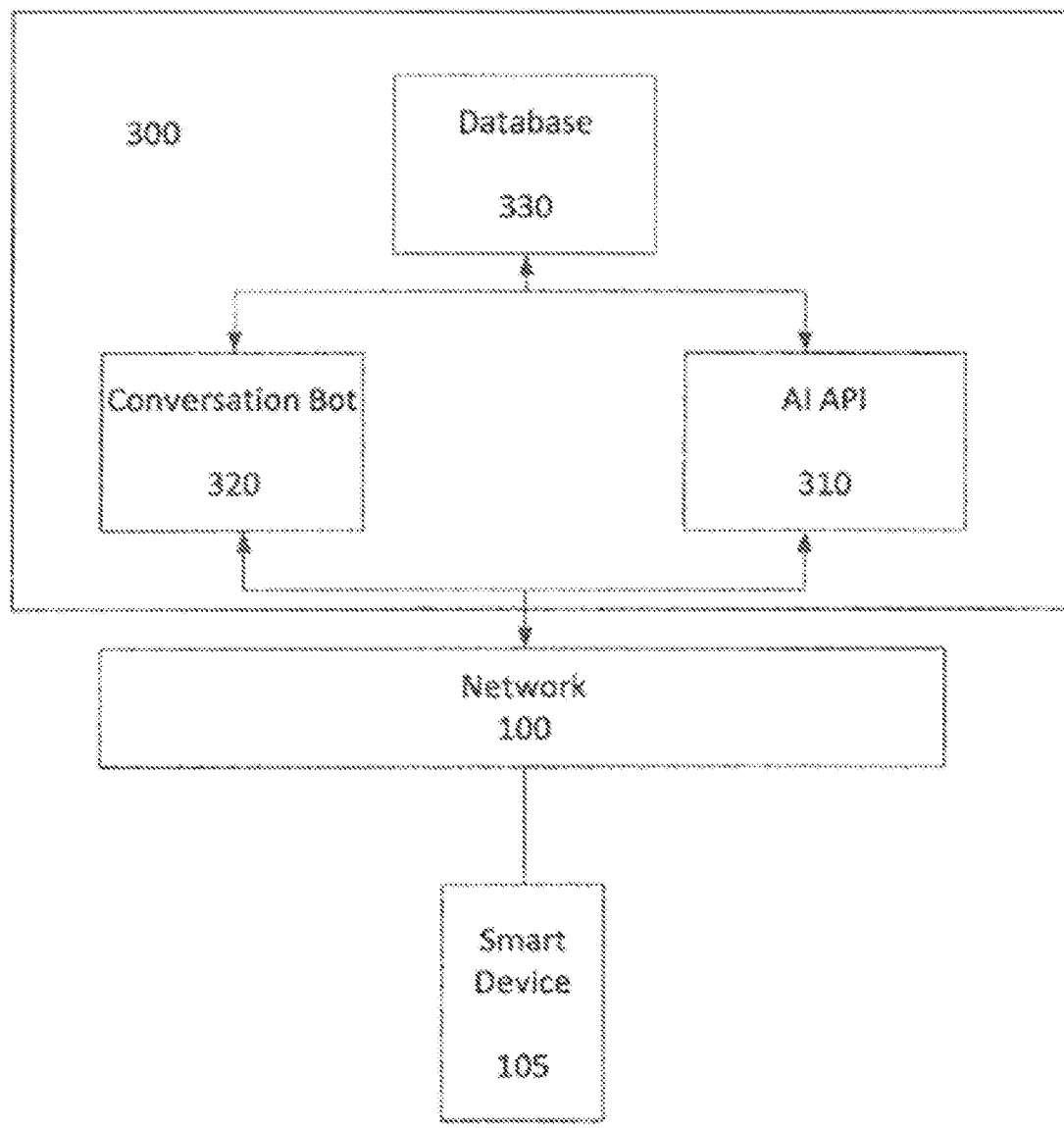
FIG. 3 depicts an example system level diagram of an illustrated embodiment for performing property inspection.
Figure 4:
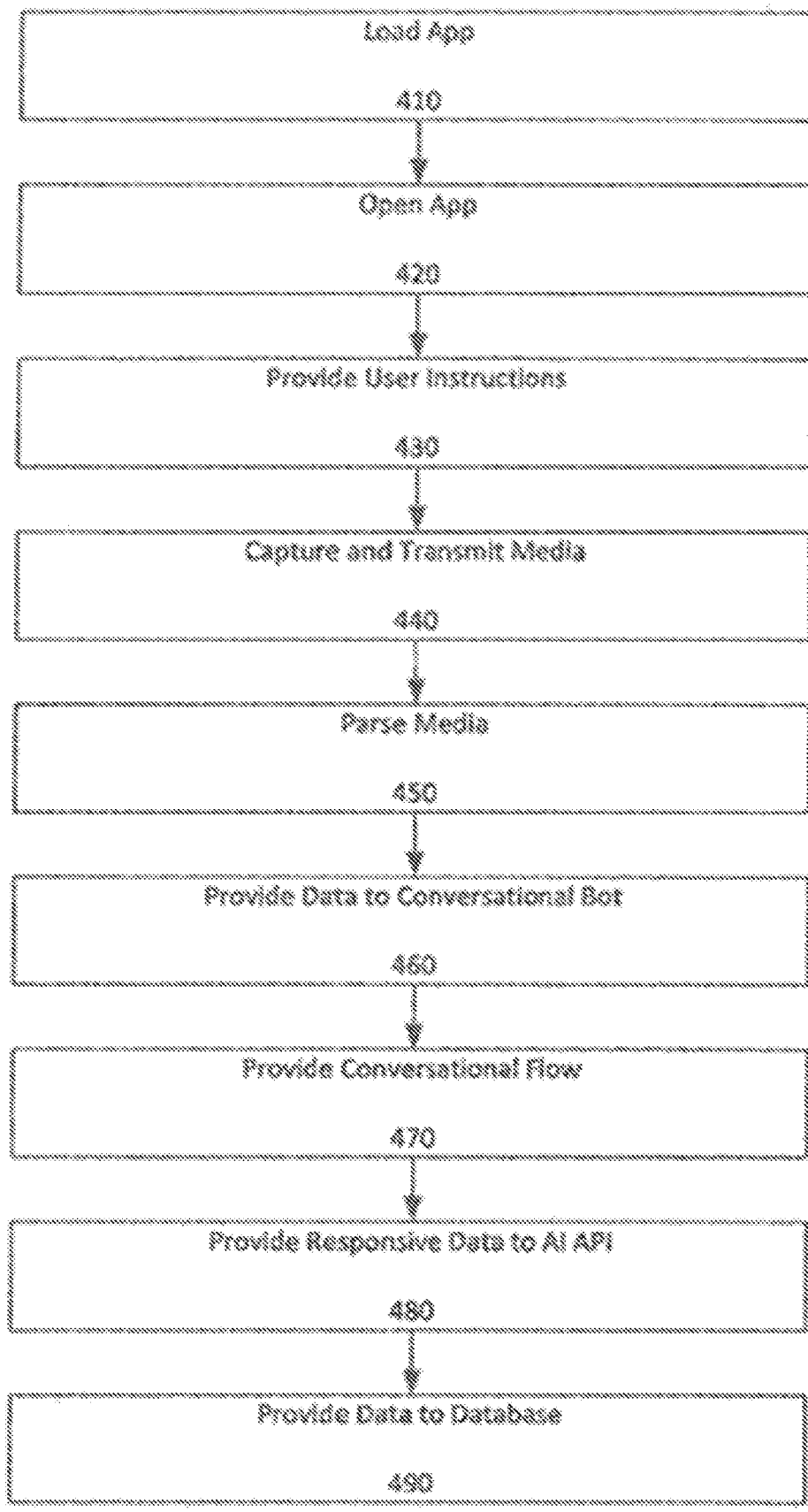
FIG. 4 illustrates a flow diagram for operation of the illustrated embodiment of FIG. 3.

With the exemplary communication network 100 (FIG. 1) and computing device 200 (FIG. 2) being generally shown and discussed above, description of certain illustrated embodiments of the present invention will now be provided. With reference now to FIGS. 3 and 4, generally what is to be described is an Artificial Intelligence (AI) assistance property inspection system 300 which provides a technical improvement for existing underwriting and inspection systems by provision of an AI intelligent computer system specifically configured to guide end users through inspections and an underwriting workflow specifically tailored for each user based upon the user's property. Components and processes to be described below include users downloading a mobile application on their smart device 101, 105 (e.g., a smart phone (iOS or Android), tablet or other portable computing devices preferably having a display and camera device. The property inspection system 300 provides a conversational assistant and user experience which guides users 105 through workflows (user conversational flows) preferably in a step-by-step format, and preferably via chat or voice, providing specifically tailored instructions for capturing photographs, video in addition to other requested information from a user. Captured photos and videos are sent from a user device 105 to system 300 which sends them to a Computer Vision Application Program Interface (API) having a computer vision image analysis system 310 for processing. As will be discussed, the Computer Vision API is configured to identify (extract data) (preferably using optical recognition techniques) and document objects, materials, structure, condition and the like associated with the photos and/or videos received from the user device 105. The data extracted by the Computer Vision API 310 is then sent to a coupled Conversational AI/Bot Service API having a conversational feature extractor system 320 configured to format user conversational flows based on what is recognized (and what is not recognized) by the Computer Vision API 310. Additionally, it is to be appreciated that data that is captured from a user device 105 by the computer vision server 106 throughout the user's interaction with server 106 is preferably stored in a records database 330, preferably as a digital record/report.

What is to be discussed below is a technological improvement to existing computer systems, particularly (but not limited to) in an underwriting process, that analyzes and processes data extracted from a user device 105 in the Computer Vision API 310 and Conversational AI/Bot Service System 320 so as to preferably determine and generate a report that is enriched with internal and external datasets in order to add pricing/value data and estimates of risk exposure.

It is to be appreciated that system 300 is described herein for illustrative use with insurance underwriting tasks, however system 300 is not to be understood to be limited to use with insurance underwriting as it may be used in with any applicable applications/usage environments. For instance, one such other use includes the moving industry wherein system 300 is configured to identify and catalogue a set of contents (e.g., a home, office, etc.), which then can be used to provide a detailed report of contents to be moved as well as their current value (as to be appreciated below).

With reference now to FIG. 3, an overall simplified view of a preferred embodiment is illustrated which depicts a user device 105 coupled via one or more networks 100 to a server system 300. The server system 300 preferably includes: the Computer System API 310, Conversational AI/Bot Service System 320 and records database 300, all preferably interconnected for bi-lateral communication with one another. It is to be appreciated that each aforesaid component is to be understood to include one or more components of computer system 200 depicted in FIG. 2.

As mentioned above, the user device 105 is to be understood to encompass a portable computer device preferably having network connection components (e.g., a cellular network transceiver), a display (e.g., a touchscreen display) and camera configured to capture both photographs and video. In accordance with the preferred illustrated embodiment of system 300, the user device 105 is to be understood to be either a smartphone device or a tablet device.

The Computer System AI API 310 is preferably configured to interact with a user device 105 so as to receive captured media (e.g., photographs and/or video) from the user device 105 to perform analysis thereon. In the preferred illustrated embodiment the AI API 310 is configured to perform insurance inspection recognition tasks on received media (as to be described herein) but it is not to be understood to be limited to only performing insurance inspection recognition tasks. In the preferred embodiment, the AI API 310 is configured, preferably using AI, to detect an environment the received media is associated with (e.g., a kitchen, living room, bedroom, garage, outside structure, roof, etc.) and more specifically objects located in that environment (e.g., stove, refrigerator, fireplace, lighting components, drapery, outdoor structure material, location of structure to nearby environmental elements (e.g., standing or still water, shrubbery, landscape grade, recreational objects (e.g., swimming pools, trampolines and the like) etc.). The AI API 310 is further configured, preferably using AI, to determine the absence of objects in a particular environment. For instance, if the environment is a kitchen, the AI API 310 may determine the absence of a fire extinguisher or if the environment is a bedroom, the AI API 310 may determine the absence of fire/smoke/CO2 detectors, or if the environment is a swimming pool the AI API 310 may determine the absence of a fence and/or certain safety equipment (e.g., life vests).

The AI API 310 is further configured to interact with the Conversational AI/Bot Service System 320 so as to essentially indicate what, and what has not, been detected by the AI API 310 upon analysis of the media received from user device 310. This information/data enables the Conversational AI/Bot Service System 320, preferably using a set of preconfigured rules, to determine a conversational flow to be presented to the user device 105 regarding requested follow-up information. For instance, if the detected environment of the received media is a kitchen and the AI API 310 is unable to detect from the received media the make/model of certain detected kitchen appliances (e.g., a stove and a refrigerator) and also the absence of certain objects (e.g., a fire extinguisher, smoke/heat/CO2 detectors), the AI API 310 then indicates the need for this additional information to the Conversational AI/Bot Service System 320. For illustrative purposes, another example of the capabilities of the AI API 310 includes if the detected environment (e.g., a living room, bedroom, etc.) includes a fireplace, the absence of protective fireplace doors/screen may be determined in addition to detection of objects possibly having flammable characteristics located in close proximity to the fireplace (e.g., furniture, drapery, etc.). In this scenario, the Conversational AI/Bot Service System 320 using its set of rules would then format a conversational flow to the user device 105 requesting what, if any, type of fire protection is provided on the fireplace and what type of material is used in the objects detected in close proximity to the fireplace.

It is thus to be appreciated that the Conversational AI/Bot Service System 320 is configured to, preferably using a set of rules, to utilize the aforesaid information provided by the AI API 310 to format a conversational flow for the user device 105. It is to be understood this conversational flow may encompass chat formats (including conversation bubbles), SMS, MSM, email, messaging and audible and/or video communication types with the user device 105. Examples of which are provided below. It is to be further understood, the AI API 310 is also configured to instruct the Conversational AI/Bot Service System 320 to determine and change the user interaction experience/conversation on the user device 105 so as to adapt based upon what is being seen by the camera and data provided by the user device 105.

The records database 330 preferably receives and stores the information determined from the AI API 310 and the Conversational AI/Bot Service System 320. With regards to the insurance industry, this stored information can be used for underwriting purposes (e.g., determine risk and premiums, premium renewals, claims determinations and adjustments, and other tasks associated with insurance underwriting. The records database 330 may further be configured to generate to a report of the premise to be insured).

Figure 5A:
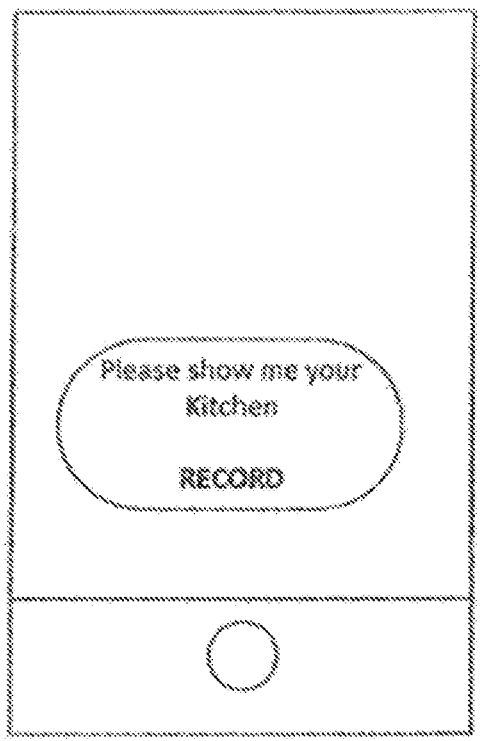
FIG. 5A illustrates a first exemplary screen shot of a user device in accordance with operation of the illustrated embodiment of FIG. 4 for performing property inspection.
Figure 5B:
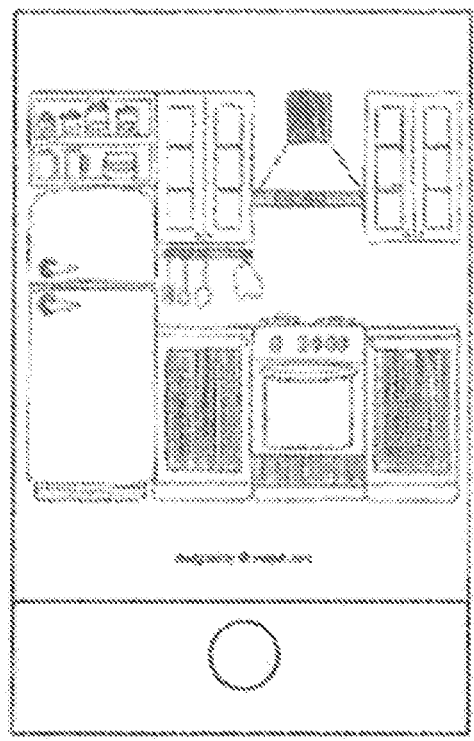
FIG. 5B illustrates a second exemplary screen shot of a user device in accordance with operation of the illustrated embodiment of FIG. 4 for performing property inspection.
Figure 5C:
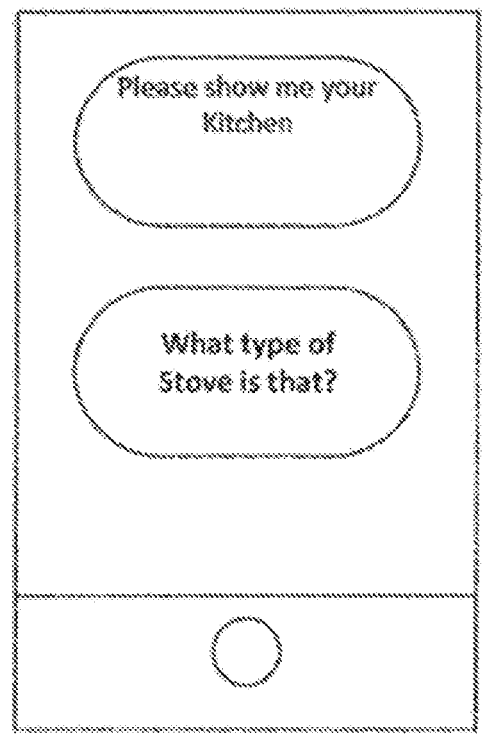
FIG. 5C illustrates a third exemplary screen shot of a user device in accordance with operation of the illustrated embodiment of FIG. 4 for performing property inspection.

With the certain components of an illustrated embodiment described above, with reference now to FIGS. 4 and 5 (with continued reference to FIG. 3), a method of operation will now be discussed. Starting at step 410, a user of user device 410 installs an application (app) formatted for their smart phone device 105 to enable the smart phone device 105 to interact as described herein with system 300. When the user desires to perform a task with system 300, such as an insurance underwriting task, the user opens the app on their device 105 to initiate an underwriting task (e.g., homeowners policy request), step 420. This in turn causes the app to interact with system 300, via network 100, such that the system 300 and app provides the user with instructions to start initiation of the requested task whereby the app preferably guides the user through an inspection of property in a conversational manner, step 430 (FIG. 5A). The app may cause the camera on user device 105 to activate to enable video and/or photograph to be captured (FIG. 5B) of the requested environment (e.g., a kitchen) so as to be transmitted to system 300 preferably for analysis by AI API 310, step 440. It is to be understood that in accordance with a preferred illustrated embodiment, the capture and transmission of media may occur simultaneous (real time).

Once the captured media is transmitted (step 440) by the user device 105 and is received by the AI API 310 in system 300, it is preferably parsed by the AI API 310 using artificial intelligence techniques, step 450, to determine objects (including object materials and condition), and the absence of objects, in a subject environment (e.g., a kitchen), as described above. As also described above, the AI API 310 provides this information to the Conversational AI/Bot Service System 320, step 460. As also mentioned above, preferably using preconfigured rules, the Conversational AI/Bot Service System 320 formats a conversation for the user device 105 (FIG. 5C) requesting additional information from the user device 105 regarding the initiated insurance underwriting task, step 470. The data responsive to the presented conversation from Conversational AI/Bot Service System 320 is then preferably sent back from user device 105 to AI API 310 for parsing and analysis, step 480. This aforesaid process is preferably continued until system 300 determines no more relevant data is to be gained from the user device 105.

It is to be appreciated the aforesaid process can be performed on a real-time basis, wherein a user of user device 105 can be capturing video that is being simultaneously analyzed by system 300. For instance, while a user is capturing video of a kitchen, conversation bubbles (the "conversation flow" sent by Conversational AI/Bot Service System 320) will appear on the user's device 105 requested certain information (e.g., make/model of an appliance, request capture of a fire extinguisher and/or other safety equipment).

Data that is captured during the assistive and adaptive workflow as described above is preferably stored in database 330, step 490. It is to be appreciated this stored data may be formatted in a comprehensive report wherein the stored data is enriched with value estimates and risk projections using information captured and identified by the AI API 310 and user input, which may include third party data. An example of such a report includes: property address; date of report; property contents; conditions; material; and risk items. Using external and internal data sets, the report is enriched such that estimates of value and the amount of risk exposure are then added to the report.

It is to be appreciated the above system 300 in accordance with the illustrated embodiment provides technical and functional improvements over existing computer systems, including, but not limited to providing a computer platform that enables property inspection to be performed by a user of a smart device who is not previously trained in property inspections, without sacrificing quality. It also provides a computing platform that enables property inspections to be performed in a more time and cost efficient manner as compared to employing trained property inspectors. Insurance providers and other parties can rely on actual property data rather than high-level analytics and assumptions. It further provides a computing platform that enables insurance providers and other parties to accurately quote insurance coverage faster and in a more personalized/tailored way, ensuring the appropriate price and level of coverage such that insurance carriers have an accurate understanding of exposure to risk and property value.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system for performing property inspections, comprising:
   a property inspection server system coupled to a network, the system including:
      a computer vision image analysis system that receives digital media from one or more user devices via the network; and
   a conversational feature extractor system configured to:
      determine an environment type associated with the digital media received by the computer vision image system, and
      detect one or more objects located in the determined environment present in the received digital media based upon a set of rules.

2. The computer system of claim 1, wherein the set of rules cause the conversational feature extractor system to analyze the one or more detected objects to determine whether the one or more detected objects match one or more objects predetermined to be present in the determined environment.

3. The computer system of claim 2, wherein the set of rules further cause the conversational feature extractor system to analyze the one or more detected objects to determine when one or more predetermined specifications can be determined from analysis of the one or more detected objects.

4. The computer system of claim 3, wherein the conversational feature extractor system is further configured to compile a conversational flow to a user indicating the one or more detected objects and determined environment the one or more detected objects are associated with.

5. The computer system of claim 1, wherein the conversational feature extractor system is further configured to determine an absence of one or more objects in the received digital media contingent upon the determined environment based upon the set of rules.

6. The computer system of claim 5, wherein the absence of the one or more objects is determined when one or more predetermined objects associated with the determined environment is not detected.

7. The computer system of claim 5, wherein the conversational feature extractor system is further configured to compile a conversational flow to a user indicating when one or more objects is determined absent from the determined environment.

8. The computer system of claim 7, wherein the determined absent object is a fire extinguisher.

9. The computer system of claim 7, wherein the conversational flow includes user instructions for capturing media associated with the one or more objects determined absent from the determined environment.

10. The computer system of claim 1, wherein the conversational feature extractor system is further configured to include conversational flow instructions which when received by a user device causes activation of one or more components on the user device.

11. The computer system of claim 10, wherein the user device is a smart phone device and the one or more components activated by the conversational flow instructions is a camera component.

12. The computer system of claim 11, wherein the conversational flow includes instructions for a user to follow regarding capture of certain media content in association with a certain type of a property inspection.

13. The computer system of claim 12, wherein the conversational flow is formatted in one of the following message types: SMS, email, audio messaging or video messaging.

14. The computer system of claim 1, wherein the determined environment is a kitchen.

15. The computer system of claim 10, wherein a detected object is a kitchen appliance.

16. A computer method for performing property inspections, comprising:
   receiving, in a computer vision image analysis system, digital media from one or more user devices via a network;
   determining an environment type associated with the digital media received by the computer vision image system;
   detecting one or more objects located in the determined environment present in the received digital media contingent upon the determined environment and based upon a set of rules, wherein the set of rules cause an analysis to determine whether the one or more detected objects match one or more objects predetermined to be present in the determined environment.

17. The computer method of claim 16, wherein the set of rules causes further analysis of the one or more detected objects to determine when one or more predetermined specifications can be determined from analysis of the one or more detected objects.

18. The computer method of claim 17, further comprising compiling a conversational flow to a user indicating the one or more detected objects and the associated determined environment.

19. The computer method of claim 16, further comprising determining an absence of one or more objects in the received digital media, wherein the absence of the one or more objects is determined when one or more predetermined objects associated with the determined environment is not detected.

20. The computer method of claim 19, further comprising compiling a conversational flow to a user indicating one or more of the absence of the one or more objects from the determined environment, user instructions for capturing media associated with the one or more objects determined absent from the determined environment, and user instructions for capturing certain specifications associated with the detected one or more objects.

* * * * *